United States Patent
Mohammed (10) Patent No.: US 9,197,674 B1
(45) Date of Patent: Nov. 24, 2015

(54) INTER-DOMAIN USER AND SERVICE MOBILITY IN SIP/SIMPLE SYSTEMS

(75) Inventor: Aziz Mohammed, Plano, TX (US)

(73) Assignee: Alcatel Lucent, Boulogne-Billancourt (FR)

( * ) Notice: Subject to any disclaimer, the term of this patent is extended or adjusted under 35 U.S.C. 154(b) by 1364 days.

(21) Appl. No.: 11/389,699

(22) Filed: Mar. 27, 2006

(51) Int. Cl.
*G06F 15/16* (2006.01)
*H04L 29/06* (2006.01)
*H04L 12/58* (2006.01)

(52) U.S. Cl.
CPC .......... *H04L 65/1006* (2013.01); *H04L 12/581* (2013.01); *H04L 12/5815* (2013.01)

(58) Field of Classification Search
CPC ............ H04L 65/1006; H04L 12/5815; H04L 12/581
USPC .................................................. 709/205, 206
See application file for complete search history.

(56) References Cited

U.S. PATENT DOCUMENTS

| | | | | |
|---|---|---|---|---|
| 2002/0037723 | A1* | 3/2002 | Roach | 455/435 |
| 2003/0176188 | A1* | 9/2003 | O'Neill | 455/433 |
| 2003/0217099 | A1* | 11/2003 | Bobde et al. | 709/202 |
| 2003/0217174 | A1* | 11/2003 | Dorenbosch et al. | 709/237 |
| 2005/0114491 | A1* | 5/2005 | Bushmitch et al. | 709/223 |
| 2005/0249152 | A1* | 11/2005 | Kiss et al. | 370/328 |

OTHER PUBLICATIONS

Schulzrinne, "SIP Registration", Oct. 2001, Internet: www.ietf.org, p. 1-10.*
Rosenberg et al. "RFC 3261—SIP: Session Initiation Protocol", Jun. 2002, Internet: itef.org, p. 1-269.*
Day et al., "RFC 2778—A Model for Presence and Instant Messaging", Feb. 2000, Internet: itef.org, p. 1-18.*
Chahbour et al., "Fast Handoff for Hierarchical Mobile SIP Networks", Apr. 2005, Proceedings of World Academy of Science, Engineering and Technology (PWASET) vol. 5, p. 34-37.*
Dutta, A.; Madhani, S.; Wai Chen; Altintas, O.; Schulzrinne, Henning, "Fast-handoff schemes for application layer mobility management," Personal, Indoor and Mobile Radio Communications, 2004. PIMRC 2004. 15th IEEE International Symposium on , vol. 3, no., pp. 1527,1532 vol. 3, Sep. 5-8, 2004.*

(Continued)

*Primary Examiner* — Taylor Elfervig
(74) *Attorney, Agent, or Firm* — Capitol Patent & Trademark Law Firm, PLLC (57) ABSTRACT

A method is described herein for enabling a person (presentity) to maintain their presence/IM service when they take their end-device and move/roam from a home network to a visited network. In one embodiment, while the person is located in the home network 104, their end-device (e.g., laptop, PDA, SIP/soft phone) uploads presence/IM information (e.g., presence rules, watcher list, service profile) from SIP/SIMPLE devices (e.g., presence server, SIP registrar, IM server). Then, after the person has taken their end-device and moved to the visited network, the end-device partially re-registers with the SIP registrar located within the home network. The end-device also partially registers with the SIP registrar located within the visited network. Once these steps are completed, then a person (presence watcher) can obtain presence information about the person (presentity) who is currently located within the visited network. In addition, a person (presence watcher) can send an IM message to the person (presentity) who is currently located within the visited network.

6 Claims, 6 Drawing Sheets

(56) References Cited

OTHER PUBLICATIONS

Vali, D.; Paskalis, S.; Kaloxylos, A.; Merakos, L., "A SIP-based method for intra-domain handoffs," Vehicular Technology Conference, 2003. VTC 2003-Fall. 2003 IEEE 58th, vol. 3, no., pp. 2068,2072 vol. 3, Oct. 6-9, 2003.*

Banerjee, N.; Acharya, A.; Das, S.K., "Seamless SIP-based mobility for multimedia applications," Network, IEEE, vol. 20, No. 2, pp. 6,13, Mar.-Apr. 2006.*

Technology White Paper "Rich Presence: A New User Communications Experience" 8 pages, copyrighted 1st quarter 2005.

J. Rosenberg "A Data model for Presence", draft-ietf-simple-data-model-05, Sep. 22, 2005, pp. 1-35.

J. Rosenberg "A Presence Event Package for the Session Initiation Protocol (SIP)", RFC 3856, Aug. 2004, pp. 1-28.

H. Shulzerinne et al "RPID: Rich Presence Extensions to the Presence Information Data Format (PIDF)", draft-ietf-simple-rpid-08, Jul. 16, 2005, pp. 1-41.

J. Rosenberg "Presence Authorization Rules", draft-ietf-simple-presence-rules-03, Jul. 20, 2005, pp. 1-27.

H. Shulzerine "SIP Registration", <draft-schulzrinne-sip-register-01.txt>, work in progress, Apr. 2001.

* cited by examiner

INTER-DOMAIN USER AND SERVICE MOBILITY IN SIP/SIMPLE SYSTEMS

TECHNICAL FIELD

The present invention is related to a method for enabling a user to maintain their presence/IM services when they move from one SIP/SIMPLE domain (e.g., home network) to a new SIP/SIMPLE domain (e.g., visited network).

BACKGROUND

The following abbreviations are herewith defined, at least some of which are referred to in the ensuing description of the prior art and the present invention.
AAA Accounting, Authorization and Authentication
DHCP Dynamic Host Configuration Protocol
HTTP Hyper Text Transfer Protocol
IM Instant Messaging
IP Internet Protocol
PDA Personal Digital Assistant
QoS Quality of Service
SIMPLE SIP for IM and Presence Leveraging Extensions
SIP Session Initiation Protocol
VPN Virtual Private Network
XCAP XML Configuration Access Protocol A main function of a presence-based SIP/SIMPLE communications network is to improve communications between a presence watcher (or, caller) and a presentity (or, callee). In such a system, the communication efficiency for a specific presence watcher in contacting a specific presentity depends on how much the presence watcher knows about the real-time status of the presentity. For example, the presence watcher may like to know the following information prior to contacting the presentity:
  Presence Information:
    Availability: Is the presentity available to be contacted?
    Activity: What is the current activity of the presentity?
    Local Time: Is this the right time to contact to the presentity?
    Devices/Media Types: How I can reach the presentity?
    More . . .
  Communication Preferences:
    What is the presentity's preferred language?
    What is the presentity's preferred device?
    What is the presentity's preferred security mode/protocol?

The real-time presence information can be used by the presence watcher to make an informed decision as to whether or not the presentity is currently available to take part in an interaction (e.g. phone call, IM). This all normally works well when the presentity happens to be located within their home network. But, if the presentity moves/roams from their home network to another SIP/SIMPLE network (e.g., visited network) then there is no effective way today for enabling a presence watcher to obtain the presentity's presence information or to send the presentity an IM message. This is because there is no effective way today for enabling a presentity to maintain their presence/IM service when they move/roam from their home network to a visited network. This problem and other problems are solved by the present invention.

BRIEF DESCRIPTION OF THE INVENTION

A method is described herein for enabling a person (presentity) to maintain their presence/IM service when they take their end-device and move/roam from a home network to a visited network. In one embodiment, while the person is located in the home network 104, their end-device (e.g., laptop, PDA, SIP/soft phone) uploads presence/IM information (e.g., presence rules, watcher list, service profile) from SIP/SIMPLE devices (e.g., presence server, SIP registrar, IM server). Then, after the person has taken their end-device and moved to the visited network, the end-device partially re-registers with the SIP registrar located within the home network. The end-device also partially registers with the SIP registrar located within the visited network. Once these steps are completed, then a person (presence watcher) can obtain presence information about the person (presentity) who is currently located within the visited network. In addition, a person (presence watcher) can send an IM message to the person (presentity) who is currently located within the visited network.

BRIEF DESCRIPTION OF THE DRAWINGS

A more complete understanding of the present invention may be obtained by reference to the following detailed description when taken in conjunction with the accompanying drawings wherein.

DETAILED DESCRIPTION OF THE DRAWINGS

Figure 1:
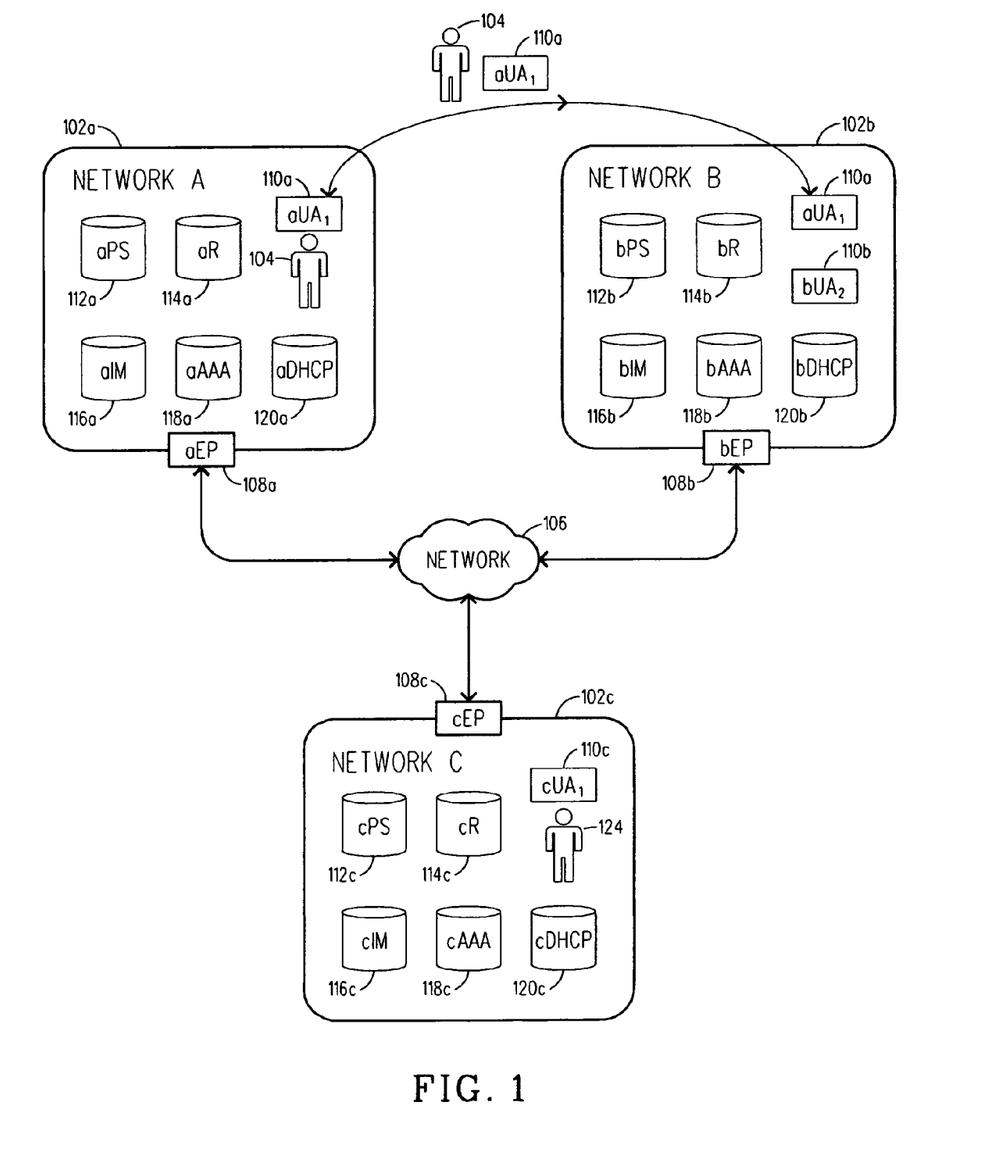
FIG. 1 is a block diagram that illustrates three networks which is used to help explain how a user (presentity) can maintain their presence/IM service when they move/roam from their home network to a visited network in accordance with the present invention.

Referring to FIG. 1, there is a block diagram that illustrates three networks 102a, 102b and 102c which is used to help explain how a user 104 (presentity 104) can maintain their presence/IM service when they take their user agent 110a and move/roam from their home network 102a to a visited network 102b in accordance with the present invention. As shown, the three networks 102a, 102b and 102c (e.g., wireline networks 102a, 102b and 102c) are inter-connected to one another via a network 106 (e.g., Internet 106) and SIP edge proxies 108a, 108b and 108c. The networks 102a, 102b and 102c each contain SIP/SIMPLE components which are involved in different aspects of the presence/IM service. These SIP/SIMPLE components include user agents 110a, 110b and 110c, presence servers 112a, 112b and 112c, SIP registrars 114a, 114b and 114c, and IM servers 116a, 116b and 116c.

A detailed discussion about these SIP/SIMPLE components and presence-based communications in general can be found in the following documents:

Jack Jachner et al. "Rich Presence: A New User Communications Experience" Technology White Paper, 8 pages, copyrighted 1st quarter 2005.

J. Rosenberg, "A Data Model for presence", draft-ietf-simple-data-model-05 (work in progress), Sep. 22, 2005.

Rosenberg, J. "A presence Event package for the Session initiation protocol (SIP)", RFC 3856, August 2004.

H. Shulzerine et al. "RPID: Rich Presence Extensions to the presence Information Data Format (PIDF)", draft-ietf-simple-rpid-08, (work in progress), Jul. 16, 2005.

Rosenberg, J. "Presence Authorization Rules", draft-ietf-simple-presence-rules-03 (work in progress), Jul. 20, 2005.

The contents of these documents are incorporated by reference herein.

In addition, the networks 102a, 102b and 102c each contain several other components which are used to help implement the present invention. These components include AAA servers 118a, 118b and 118c, and DHCP servers 120a, 120b and 120c. How these components and the SIP/SIMPLE components can be used to enable the user 104 (presentity 104) to maintain their presence/IM service when they take the user agent 110a and move/roam from the home network 102a to the visited network 102b is discussed below with respect to FIGS. 2-7.

Figure 2:
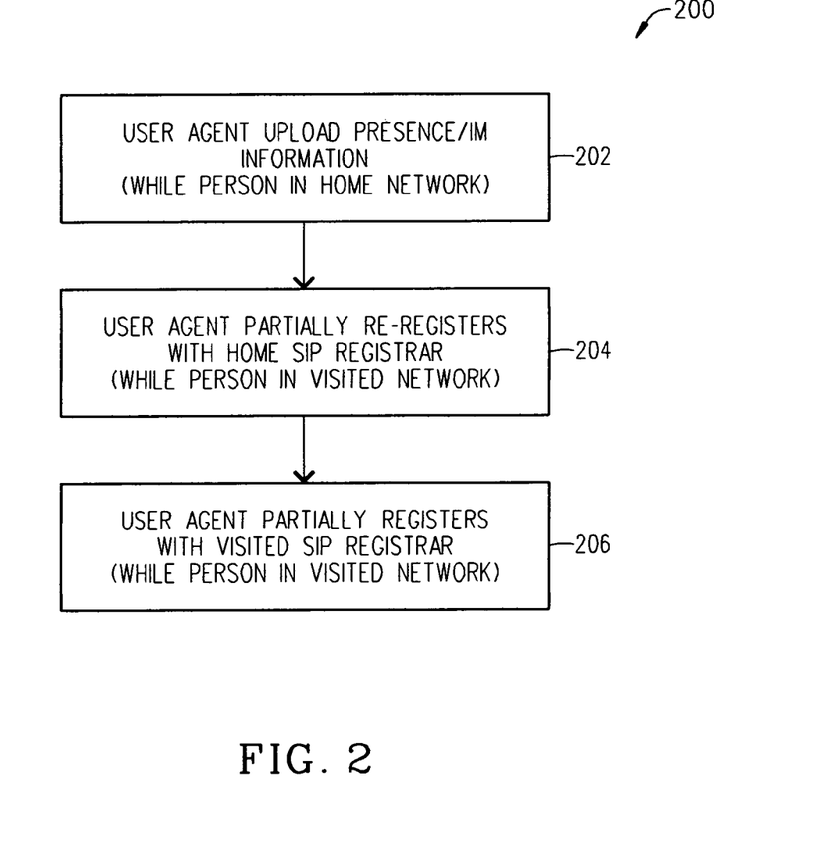
FIG. 2 is a flowchart that illustrates the basic steps of a method for enabling a user (presentity) to maintain their presence/IM service when they move/roam from their home network to a visited network in accordance with the present invention.

Referring to FIG. 2, there is a flowchart that illustrates the basic steps of a method 200 for enabling the user 104 (presentity 104) to maintain their presence/IM service when they take their user agent 110a and move/roam from their home network 102a to a visited network 102b in accordance with the present invention. Beginning at step 202, while the user 104 is located in the home network 104, their particular user agent 110a (e.g., laptop 110a, desktop 110a, PDA 110a, SIP/soft phone 110a) uploads presence/IM information 122a (e.g., presence rules, watcher list, service profile) from the SIP/SIMPLE devices 112a, 114a and 116a. For example, the user agent 110a can be programmed to upload the presence/IM information 122a whenever the user 104 initiates some sort of trigger event (e.g., log-offs). At step 204, after the user 104 has taken their user agent 110a and moved to the visited network 102b, the user agent 110a partially re-registers with the SIP registrar 114a located within the home network 102a. At step 206, after the user 104 has taken their user agent 110a and moved to the visited network 102b, the user agent 110a partially registers with the SIP registrar 114b located within the visited network 102b. Upon completing steps 202, 204 and 206, a person 124 (presence watcher 124) that is located in network 102c (for example) can obtain presence information about the roaming user 104. In addition, the person 124 can send an IM to the roaming user 104. A detailed discussion about how each of these steps 202, 204 and 206 can be implemented in accordance with one embodiment of the present invention is provided next with respect to FIGS. 3-5.

Figure 3:
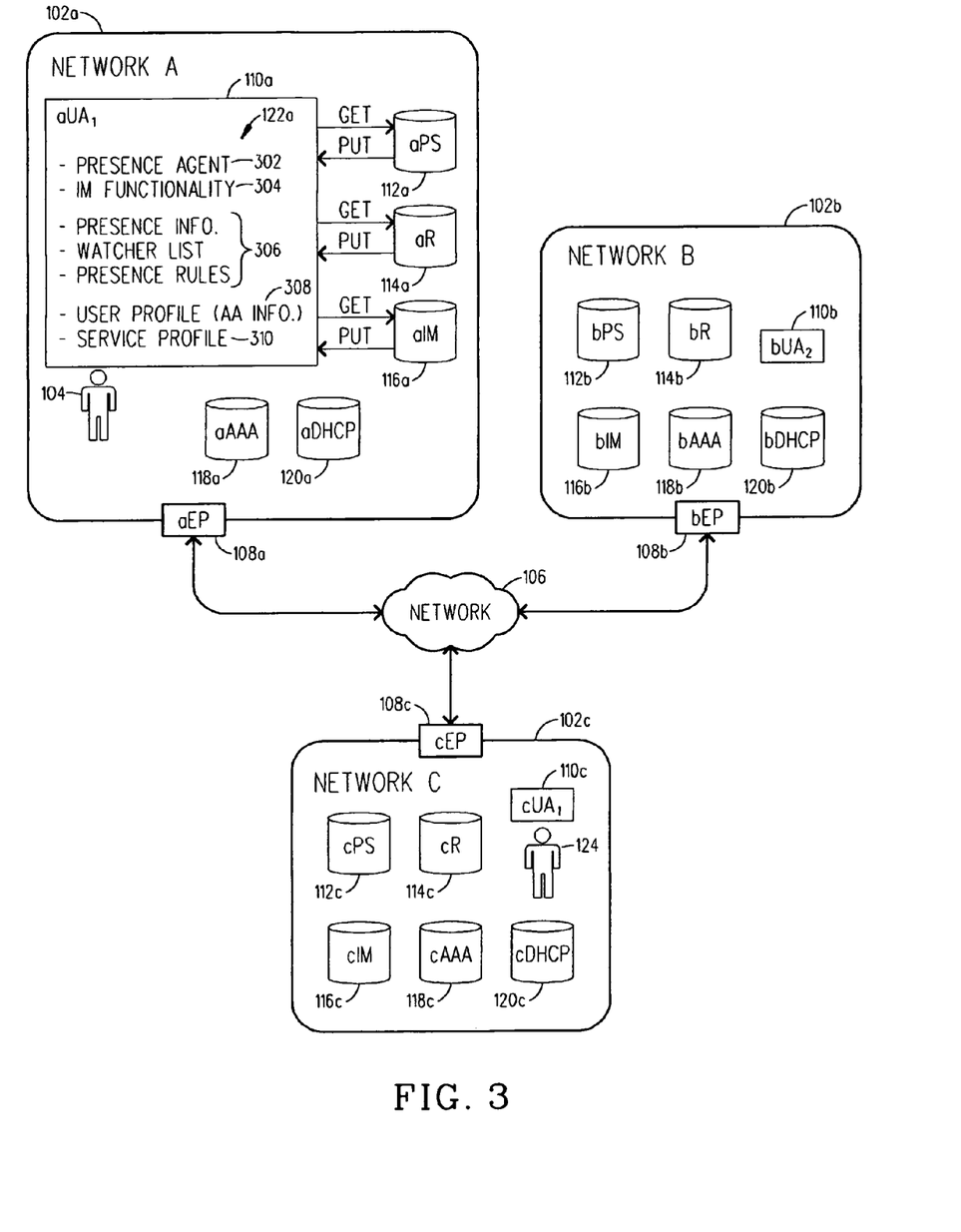
FIG. 3 is a block diagram of the three networks shown in FIG. 1 which is used to help explain how the user's device (e.g., user agent) uploads presence/IM information from SIP/SIMPLE devices located within the home network before the user moves to the visited network in accordance with the present invention.

Referring to FIG. 3, there is a block diagram of the three networks 102a, 102b and 102c which is used to help explain how the user's device 110a (e.g., user agent 110a) uploads the presence/IM information 122a from the SIP/SIMPLE devices 114a, 116a and 118a located within the home network 102a before the user 104 takes their user agent 110a and moves to the visited network 102b. First, it is assumed that the user agent 110a (e.g., laptop 110a, desktop 110a, PDA 110a, SIP/soft phone 110a) is capable of storing/carrying presence agent and IM exchange functionalities. As such, when the user agent 110a is attached to the home network 102a (or any SIP/SIMPLE network 102) it can upload presence/IM information 122a from the presence server 112a, the SIP registrar 114a and/or the IM server 116a. In particular, when the user agent 110a is triggered (e.g., the person 104 starts to detach the user agent 110a from the network 102a) it can terminate the presence and IM functions in the home network 102a and migrate the necessary presence/IM information 122a from the presence server 112a, the SIP registrar 114a and/or the IM server 116a. The user agent 110a can upload (or copy) the following presence/IM information 122a:

The presence agent functionality 302 (from the presence server 112a) and IM functionality 304 (from the IM server 116a).

The presence information, watcher list and presence rules 306 (from the presence server 112a).

The user profile 308 (including encrypted/non-encrypted authentication/authorization information) and the service profile 310 (from the SIP registrar 114a).

For instance, the user agent 110a can upload the presence/IM information 122a from the presence server 112a, the SIP registrar 114a and/or the IM server 116a by using GET and PUT commands which are associated with XCAP or HTTP protocols.

Figure 4:
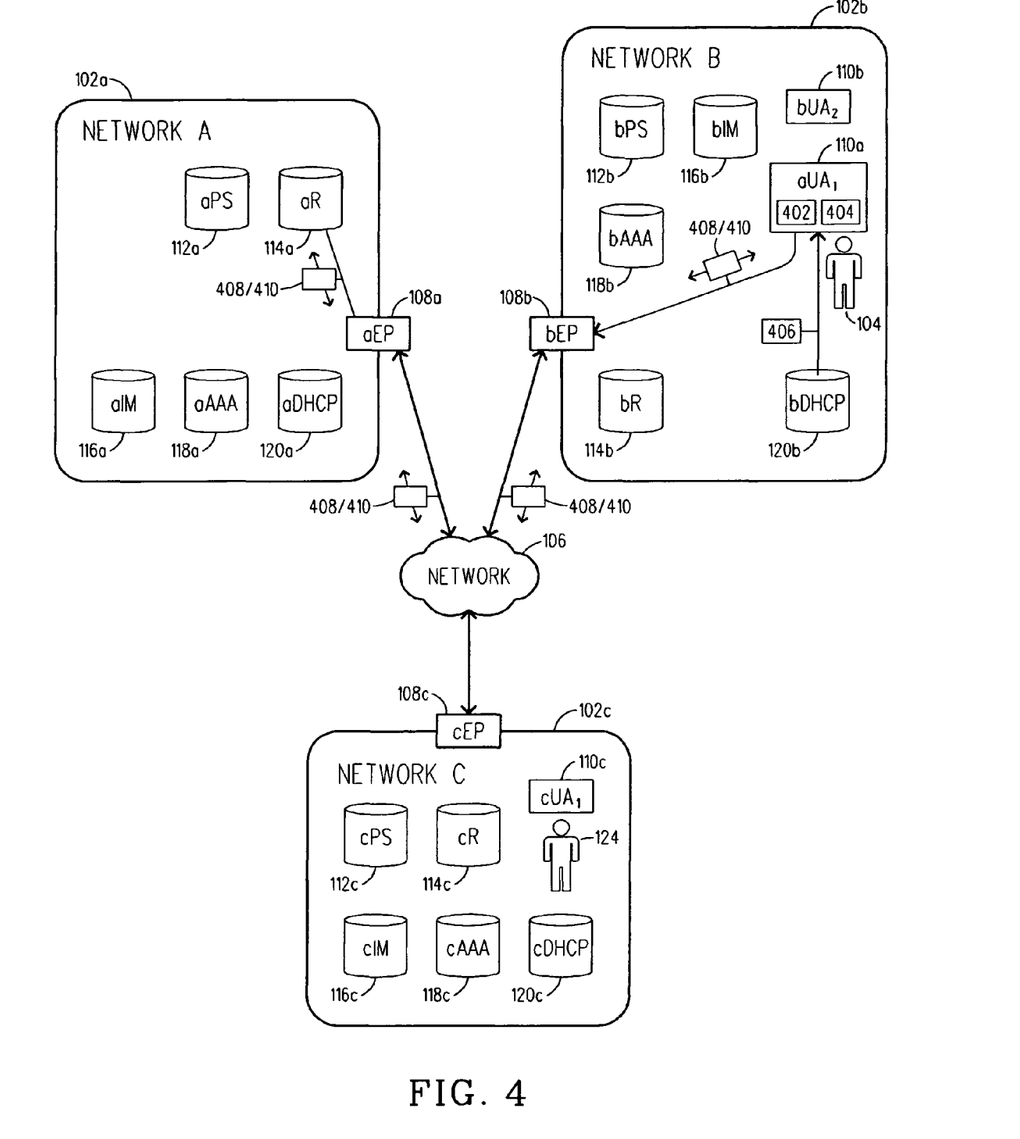
FIG. 4 is a block diagram of the three networks shown in FIG. 1 which is used to help explain how the user's device (e.g., user agent) partially re-registers with a SIP registrar located within the home network after the user has moved to the visited network in accordance with the present invention.

Referring to FIG. 4, there is a block diagram of the three networks 102a, 102b and 102c which is used to help explain how the user's device 110a (e.g., user agent 110a) partially re-registers with the SIP registrar 114a located within the home network 102 after the user 104/user agent 110a have moved to the visited network 102b. Once the user 104 attaches their user agent 110a to the visited network 102b, then the user agent 110a (in particular a processor 402 and memory 404 with instructions stored therein) initiates the partial re-registration with the home network 102a to update a CONTACT field within the SIP registrar 114a. This can be done as follows:

A. The user agent 110a obtains (is assigned) a new IP address 406 by interacting with a dynamic configuration mechanism that is available in the visited network 102b, such as the DHCP server 120b.

B. The user agent 110a sends a SIP REGISTER request 408 to the SIP registrar 114a located within the home network 102a. For instance, the SIP REGISTER request 402 could look like:

From: userA@homenetwork.com
To: userA@homenetwork.com
Call_ID: 8293345@server1.home.com
  CONTACT: userA@new IP address; expires 3600
    (note: this inserts a new contact IP address for the visited network 102b)
    userA@old IP address; expire 0 (note: this deletes the old contact IP address for the home network 102)
Content length 0

Assuming all goes well, a corresponding OK response 410 is sent from the home SIP registrar 114a to the user agent 110a. As can be seen, this partial re-registration process effectively informs both the home SIP registrar 114a and the visited SIP registrar 114*b* as to where the person 104/user agent 110*a* is currently located.

Figure 5:
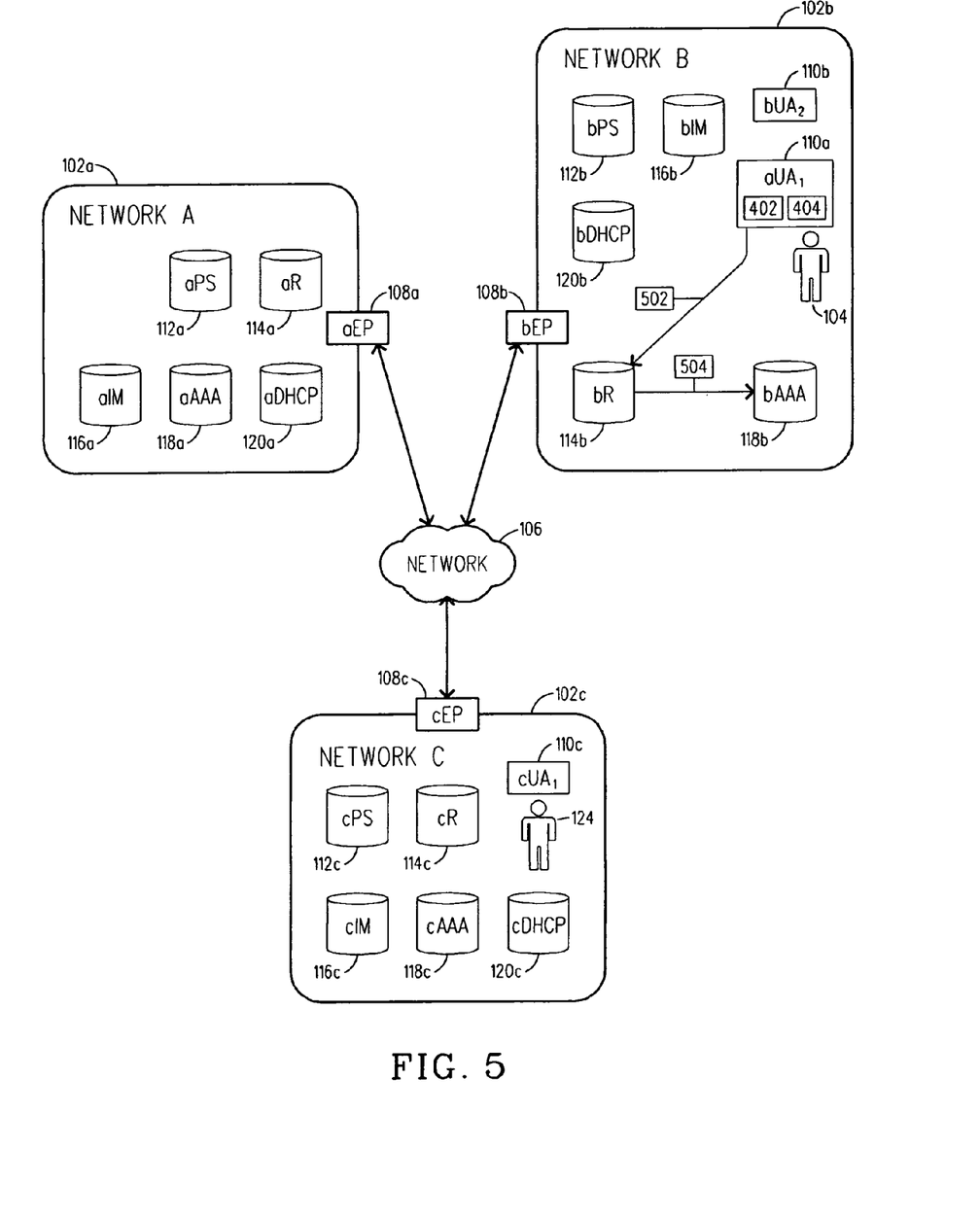
FIG. 5 is a block diagram of the three networks shown in FIG. 1 which is used to help explain how the user's device (e.g., user agent) partially registers with a SIP registrar located within the visited network after the user has moved to the visited network in accordance with the present invention.

Referring to FIG. 5, there is a block diagram of the three networks 102*a*, 102*b* and 103*c* which is used to help explain how the user's device 110*a* (e.g., user agent 110*a*) partially registers with the SIP registrar 114*b* located within the visited network 102*b* after the user 104/user agent 110*a* have moved to the visited network 102*b*. After the user 104 attaches their user agent 110*a* to the visited network 102*b*, then the user agent 110*a* (in particular a processor 402 and memory 404 with instructions stored therein) initiates the partial registration with the visited network 102*b* for routing (proxy) support of the presence/IM service used by person 104 while he/she is located within the visited network 102*b*. This can be done as follows:

A. The user agent 110*a* sends a REGISTER request 502 with its new IP address within the CONTACT field and its authorization/authentication information (AA parameter) within the BODY field to the visiting SIP registrar 114*b*. Note: the new IP address sent to the SIP registrar 114*b* in the visited network 102*b* was obtained from the DHCP server 120*b* when the user agent 110*a* attached to the visited network 102*b* (see FIG. 4).

B. The SIP registrar 114*b* then authenticates/authorizes the person 104/user agent 110*a*. To accomplish this, the networks 102*a* and 102*b* should co-operate with one another at one of the levels discussed next. In one level, the networks 102*a* and 102*b* can be different sites of the same company, in which case, the user 104 can safely duplicate their user profile information in both networks 102*a* and 102*b* for authentication and authorization purposes. In this case:

The SIP registrar 114*b* (within the visited network 102*b*) sends an inquiry 504 about the AA parameter of user 104 to its own AAA server 118*b* for verification. Note: that user's 104 AA parameters were located in the BODY field of the REGISTER request 502 which was previously sent to the SIP registrar 114*b* (this scenario is shown in FIG. 5).

In another level, if the collaboration level between the two networks 102*a* and 102*b* is such that the AAA servers 118*a* and 118*b* do not contain duplicate user profile information, then the authentication/authorization verification could be completed as follows (this scenario is not shown in FIG. 5):

A REGISTER request (including AA parameters) is sent from the user agent 110*a* which is located within the visited network 102*b* to the visited SIP registrar 114*b*.

The SIP registrar 114*b* sends an inquiry about the AA parameters associated with person 104/user agent 110*a* to the AAA server 118*b* located with visited network 102*b*.

The AAA server 118*b* passes the inquiry to the AAA server 118*a* located in the home network 102*a*.

The home AAA server 118*a* verifies the AA parameters associated with person 104/user agent 110*a*.

The home AAA server 118*a* sends a response which indicates whether or not the AA parameters were verified to the visited AAA server 118*b*.

The visited AAA server 118*b* passes the response to the visited SIP registrar 114*b*.

The visited SIP registrar 114*b* passes the response to the person 104/user agent 110*a*.

At each level, if the response from the home AAA server 118*a* or the visited AAA server 118*b* is positive then the partial re-registration of person 104/user agent 110*a* in the visited network 102*b* is completed. During the time, that the person 104/user agent 110*a* is partially registering with the visited network 102*b*, the visited SIP registrar 114*b* also assigns a new temporary identifier: userA%40client.homenetwork.com@visitednetwork.com (for example) to person 104/user agent 110*a*. This new temporary identifier allows the visited SIP edge proxy 108*b* to route in-bound requests/messages to the user 104/user agent 110*a*. A detailed discussion about how the new temporary identifier can be assigned is found in the following document:

H Schulzrinne, "SIP Registration", <draft-schulzrinne-sip-register-01.txt>, work in progress, April 2001.

The contents of this document are incorporated by reference herein.

Figure 6:
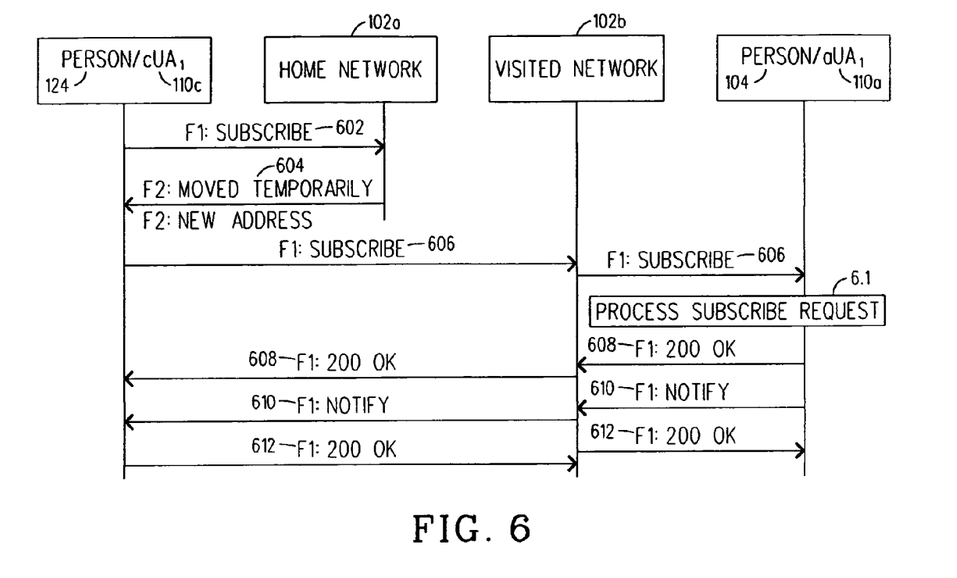
FIG. 6 is a signal flow diagram which is used to help explain how a person can obtain presence information about the user who has taken their user agent and moved from the home network to the visited network in accordance with the present invention.

Once, the user agent 110*a* has uploaded the presence/IM information 122*a* (see step 202 and FIG. 3) and successfully completed the partial re-registration and new registration in the home network 102*a* and the visited network 102*b*, respectively (see steps 204 and 206 and FIGS. 4-5). Then, a person 124 (who could be located in anyone of the networks 102*a*, 102*b* and 102*c*) can obtain presence information about the person 104 who has taken their user agent 110*a* and moved from the home network 102*a* to the visited network 102*b*. FIG. 6 is a signal flow diagram which is used to explain how a person 124 (who in this example happens to be located in network 102*c*) can obtain presence information about person 104 (who is located in visited network 102*b*). The exemplary steps are as follows:

A. The person 104 updates the presence information within their user agent 110*a*.

B. The person 104 also activates their watcher list, presence rules as well as all of the other pertinent service parameters.

C. Now, when person 124 (or any other person) from network 102*c* (or any of the networks 102*a*, 102*b* or 102*c*) wants to receive presence information about person 104 the following can happen:

The person 124/user agent 110c sends a SUBSCRIBE request to the home network 102a of person 104 (see signal 602).
    The home network 102a sends person 124/user agent 110c a "temporarily moved"message together with the new address of person 104/user agent 110a (see signal 604).
    The person 124/user agent 110c then sends a SUBSCRIBE request to the new address of person 104/user agent 110a (see signal 606).
    The user agent 110a (in particular the presence agent therein) processes the SUBSCRIBE request as follows (see box 6.1):
        If person 124 is already present in the watcher list, then he/she will receive an OK signal and a NOTIFY signal (which contains filtered presence information)(see signals 608 and 610).
        If on the other hand, person's 124 SUBSCRIBE request is new, then person 104 needs to decide whether to accept or reject the SUBSCRIBE request:
            i. If the SUBSCRIBE request is rejected, then a 401 response is sent to person 124/user agent 110c (signal not shown).
            ii. If the SUBSCRIBE request is accepted, then:
                Include person 124 in the watcher list.
                Apply the corresponding presence rule on person's 104 raw presence information.
                Send an OK signal and a NOTIFY request with the filtered presence information to person 124 (see signals 608 and 610).
                In response, person 124/user agent 110c sends a 200 OK signal to person 104/user agent 110a (see signal 612).

As can be seen, all of these presence functions are handled primarily by the user agent 110a. No network entity is directly involved.

Figure 7:
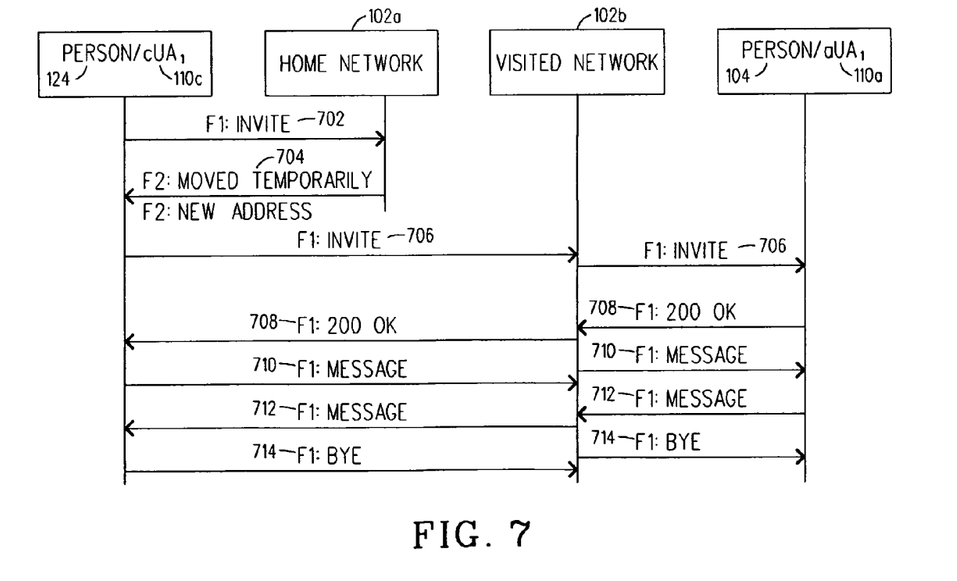
FIG. 7 is a signal flow diagram which is used to help explain how a person can send/receive IMs to/from the user who has taken their user agent and moved from the home network to the visited network in accordance with the present invention.

The person 124 (or any person) may also exchange IMs with person 104 who has taken their user agent 110a and moved from the home network 102a to the visited network 102b. FIG. 7 is a signal flow diagram which is used to explain how a person 124 (who happens to be located in network 102c) can exchange IMs with person 104 (who is located in visited network 102b). The exemplary steps are as follows:

The person 124/user agent 110c sends an INVITE request to the home network 102a of person 104 (see signal 702).

The home network 102a sends person 124/user agent 110c a "temporarily moved" message together with the new address of person 104/user agent 110a (see signal 704).

The person 124/user agent 110c then sends an INVITE request to the new address of person 104/user agent 110a (see signal 706).

The person 104/user agent 110a (in particular the user agent 110a) sends an OK signal to person 124/user agent 110c (see signal 708).

The person 124/user agent 110c sends a MESSAGE signal (which contains the text of the IM) to person 104/user agent 110a (see signal 710).

The person 104/user agent 110a sends a MESSAGE signal (which contains the text of the IM) to person 124/user agent 110c (see signal 712).

The sending/receiving of MESSAGE signals continues until person 104 or person 124 no longer wants to exchange IMs. In this example, person 124 stops the IM session by sending a BYE message to person 104/user agent 110a (see signal 714).

From the foregoing, it can be readily appreciated that the present solution would be useful in many different situations where a person 104 would want to take their user agent 110a and move from one wireline network 102a to another wireline network 102b. Several such exemplary situations are as follows:

An employee 104 from network 102a moves to another site (network 102b) of the same company.

A sales person 104 from network 102a moves to a customer site (network 102b).

A project leader 104 from network 102a moves to a partner site (network 102b).

Two separate service providers have a business relationship to support presence and IM services across their networks 102a and 102b (e.g. enterprise and operator networks 102a and 102b).

A person 124 (e.g., presence watcher 124) located in network 102c wants to communicate using presence and IM with person 104 (e.g., presentity 104) in a seamless manner without regard to the presentity's network attachment.

Following are some additional features and advantages of the present solution:

1. The present solution is easily extendable to support personal and service mobility in both wireless and wireline networks.

2. The present solution can be extended to other SIP/SIMPLE real-time media services such as voice and video so long as the QoS requirements of these media for roaming users are satisfied.

3. There is no complex interaction between SIP entities and AAA servers within or across the networks 102a, 102b and 102c. This is possible in part because the user agent 110a uploads the AA parameters while it is located within the home network 102a and then the person 104 carries the user agent 110a along with the AA parameters to the visited network 102b. This is a marked improvement over state-of-the-art VPNs or home networks (which maintain the control over the roaming user) because the user has to take part in the entire verification process for AAA purposes while they are remote from their home network 102a.

4. The traffic load to the networks 102a, 102b and 102c and delay to real time applications are reduced because the user agent 110a contains the presence agent and services parameters.

5. The user agent 110a processes it's own presence and IM functions which reduces the processing burden on the home network 102a and the visited network 102b.

Although one embodiment of the present invention has been illustrated in the accompanying Drawings and described in the foregoing Detailed Description, it should be understood that the present invention is not limited to the embodiment disclosed, but is capable of numerous rearrangements, modifications and substitutions without departing from the spirit of the invention as set forth and defined by the following claims.

What is claimed is:

1. A user agent device comprising:
a processor and a memory configured to store instructions for execution by the processor, the processor configured to execute the stored instructions for:
retrieving presence/IM information associated with the user agent device from SIP/SIMPLE devices located within a home network while the user agent device is located in the home network, wherein the retrieving is initiated by a trigger event where the user agent is relocating from the home network to a visited network;
obtaining a new IP address from the visited network when the user agent device is relocated from the home network to the visited network;
sending the new IP address in a single SIP REGISTER request to a first SIP registrar located within the home network, the single SIP REGISTER request containing a single CONTACT field that contains both the new IP address from the visited network and instructions to delete an old IP address; and
partially registering the user agent device with a second SIP registrar located within the visited network using by sending a SIP REGISTER request to the second SIP registrar in the visited network containing the single CONTACT field that contains both the new IP address and a BODY field that contains authorization/authentication information which was retrieved from the user agent when carried by the user agent from the home network to the visited network.

2. The user agent device of claim 1, wherein said uploaded presence/IM information is selected from the group consisting of:
a presence agent;
IM parameters;
presence information;
a watcher list;
presence rules;

a user profile including authorization/authentication information and a service profile.

3. A method for maintaining a presence/IM service comprising:

retrieving presence/IM information associated with the user agent device from SIP/SIMPLE devices located within a home network while the user agent device is located in the home network, wherein the retrieving is initiated by a trigger event where the user agent is relocating from the home network to a visited network;

obtaining a new IP address from a visited network when the user agent device is relocated from the home network to the visited network, sending the new IP address to a first SIP registrar located within the home network as a single SIP REGISTER request containing a single CONTACT field that contains both the new IP address and instructions to delete an old IP address, and partially registering the user agent device with a second SIP registrar located within the visited network by sending a SIP REGISTER request to the second SIP registrar in the visited network, the SIP REGISTER request containing the single CONTACT field that contains both the new IP address and a BODY field that contains authorization/authentication information which was retrieved from the user agent when carried by the user agent from the home network to the visited network.

4. The method of claim 3, wherein said SIP/SIMPLE devices located with the home network are selected from group consisting of:

a presence server;

a SIP registrar; and an IM server.

5. The method of claim 3, wherein said uploaded presence/IM information is selected from the group consisting of:

a presence agent;

IM parameters;

presence information;

a watcher list;

presence rules;

a user profile including authorization/authentication information and a service profile.

6. The method of claim 3, further comprising receiving an instant message at the user agent device located in the visiting network.

\* \* \* \* \*